Dec. 17, 1963 D. B. HAAGENSEN 3,114,875
MICROWAVE DEVICE FOR TESTING FORMATIONS SURROUNDING A BOREHOLE
HAVING MEANS FOR MEASURING THE STANDING WAVE RATIO OF
ENERGY INCIDENT TO AND REFLECTED FROM THE FORMATIONS
Filed May 4, 1961 3 Sheets-Sheet 1
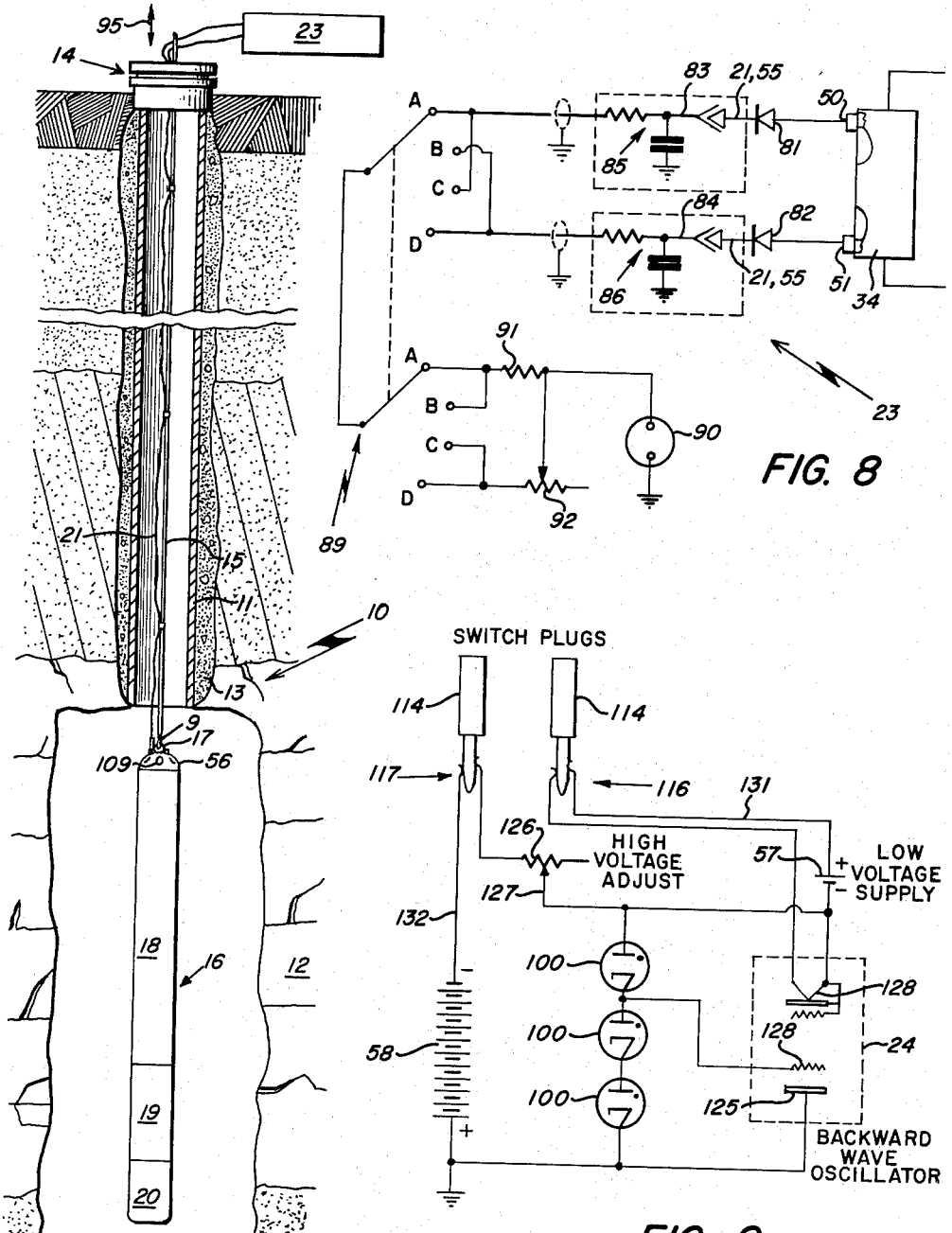
FIG. 1
FIG. 8
FIG. 9
INVENTOR
DUANE B. HAAGENSEN
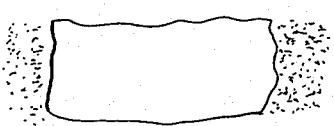
ATTORNEY Dec. 17, 1963 D. B. HAAGENSEN 3,114,875
MICROWAVE DEVICE FOR TESTING FORMATIONS SURROUNDING A BOREHOLE
HAVING MEANS FOR MEASURING THE STANDING WAVE RATIO OF
ENERGY INCIDENT TO AND REFLECTED FROM THE FORMATIONS
Filed May 4, 1961 3 Sheets-Sheet 2

INVENTOR
DUANE B. HAAGENSEN
BY Robert F. Connell
ATTORNEY

Dec. 17, 1963 D. B. HAAGENSEN 3,114,875
MICROWAVE DEVICE FOR TESTING FORMATIONS SURROUNDING A BOREHOLE
HAVING MEANS FOR MEASURING THE STANDING WAVE RATIO OF
ENERGY INCIDENT TO AND REFLECTED FROM THE FORMATIONS
Filed May 4, 1961 3 Sheets-Sheet 3

INVENTOR
DUANE B. HAAGENSEN
BY Robert N. O'Connell
ATTORNEY

United States Patent Office 3,114,875
Patented Dec. 17, 1963

3,114,875
MICROWAVE DEVICE FOR TESTING FORMATIONS SURROUNDING A BOREHOLE HAVING MEANS FOR MEASURING THE STANDING WAVE RATIO OF ENERGY INCIDENT TO AND REFLECTED FROM THE FORMATIONS
Duane B. Haagensen, South Lincoln, Mass., assignor to Raytheon Company, Lexington, Mass., a corporation of Delaware
Filed May 4, 1961, Ser. No. 107,785
3 Claims. (Cl. 324—1)

This invention relates generally to testing devices and more particularly to testing devices for measuring the characteristics of a subsurface formation.

In many industries and, particularly in the petroleum industry, it is desirable to know the general physical characteristics of a subsurface formation into which a well bore has been sunk. Various logging tools have been developed to help provide information with regard to these characteristics. For example, gamma and beta ray apparatus measuring the radiation intensities of radioactive materials present in a formation indicate differences in structure that exist among subsurface strata. Neutron logging instruments indicate the hydrogen content of subsurface formations by utilizing the influence of the presence of hydrogen on the energy losses of neutrons that are transmitted through the formations. Acoustic devices utilizing sonic energy transmission measurements have also been utilized. While such devices are helpful in determining some of the characteristics of a particular formation, they do not provide sufficient information to be useful in all applications.

The invention described herein provides a valuable addition to the family of logging tools presently available to those interested in obtaining information with respect to the characteristics of subsurface formations. By appropriate utilization of this invention it is possible to determine the dielectric constant of a subsurface core formation for indicating, for example, the presence of and value of petroleum products that may be located therein. For example, the water content of petroleum formations can be approximately determined from a knowledge of the dielectric constant of the formation. Moreover, from such knowledge it is possible to suitably classify different formations at various locations in accordance with their dielectric constants.

The invention may be useful in conjunction with secondary recovery methods, especially those which utilize high-frequency electromagnetic energy to enhance such recovery.

One such method involves the use of high-frequency electromagnetic energy which is radiated from the well bore into the formation in order to heat the formation and, thus, provide a greater flow of oil into the well bore. One particular device utilized for such high-frequency heating is described in my previously filed patent application, Serial No. 28,340, entitled "Oil Well Microwave Tools," filed May 11, 1960. In that particular application there is described a method of utilizing high-frequency energy, especially in the microwave region of the frequency spectrum, to enhance the recovery of petroleum products in subsurface reservoirs.

This invention herein described by providing a means for determining the reflection characteristics of a subsurface formation and, hence, its dielectric characteristics, permits the most efficient use of such a high-frequency heating tool. Moreover, in the utilization of such tools, undesirable reflections of energy may occur from the well bore back toward the high-frequency energy source. Such reflected energy reduces the effectiveness of the heating that is desired and may cause undesirable overheating of the energy sources themselves so that they may become either temporarily or permanently damaged. This invention, by determining the reflection characteristics of the core formation in those regions opposite which the microwave heating tool is expected to be placed, permits the operator to avoid those regions at which undesirable damaging reflections may occur.

In one specific embodiment of the invention, for example, there is provided a single source of high-frequency microwave energy, such as a backward wave oscillator, which is placed within a capsule that can be lowered into the well bore from the surface. The high-frequency energy source is adapted to radiate microwave energy from a radiation cavity through a plastic portion of the capsule into the well bore formation. By means of a bi-directional coupler and suitable cabling associated with the high-frequency energy source and the radiation cavity, information concerning the relative values of the incident power applied to the formation and of the power reflected from the formation back toward the energy source is transmitted from the capsule to a voltage standing wave ratio (VSWR) indicator located at the surface.

A measurement of the voltage standing wave ratio can be obtained from determination of the ratio of reflected to incident power in accordance with the following equation:

$$\text{VSWR} = \frac{1+\sqrt{\alpha}}{1-\sqrt{\alpha}} \qquad (1)$$

wherein VSWR is defined as the voltage standing wave ratio and $\alpha$ is defined as the "ratio of reflected power to incident power." If the reflected to incident power ratio is excessive at specified regions of the formation, the oil well microwave heating tool is positioned so as to avoid these regions and, thus, prevent the possibility of damage to the magnetron.

The testing device disclosed in this invention may also be used as a general logging tool in order to supply other information with respect to the core formation. For example, the dielectric constant of the core formation may be determined by utilizing this invention. A measurement of the reflected and incident power at a core formation provides an indication of the reflection coefficient of the formation, which in turn provides a determination of the specific dielectric constant at the formation as explained in more detail in the description of the structure and operation of the invention which follows:

The invention and its operation may be more easily described with the aid of the accompanying drawing in which:

FIG. 1 shows a cross section of a well bore wherein a test device of the invention in the form of a capsule has been placed;

Figures 2, 3, 4:
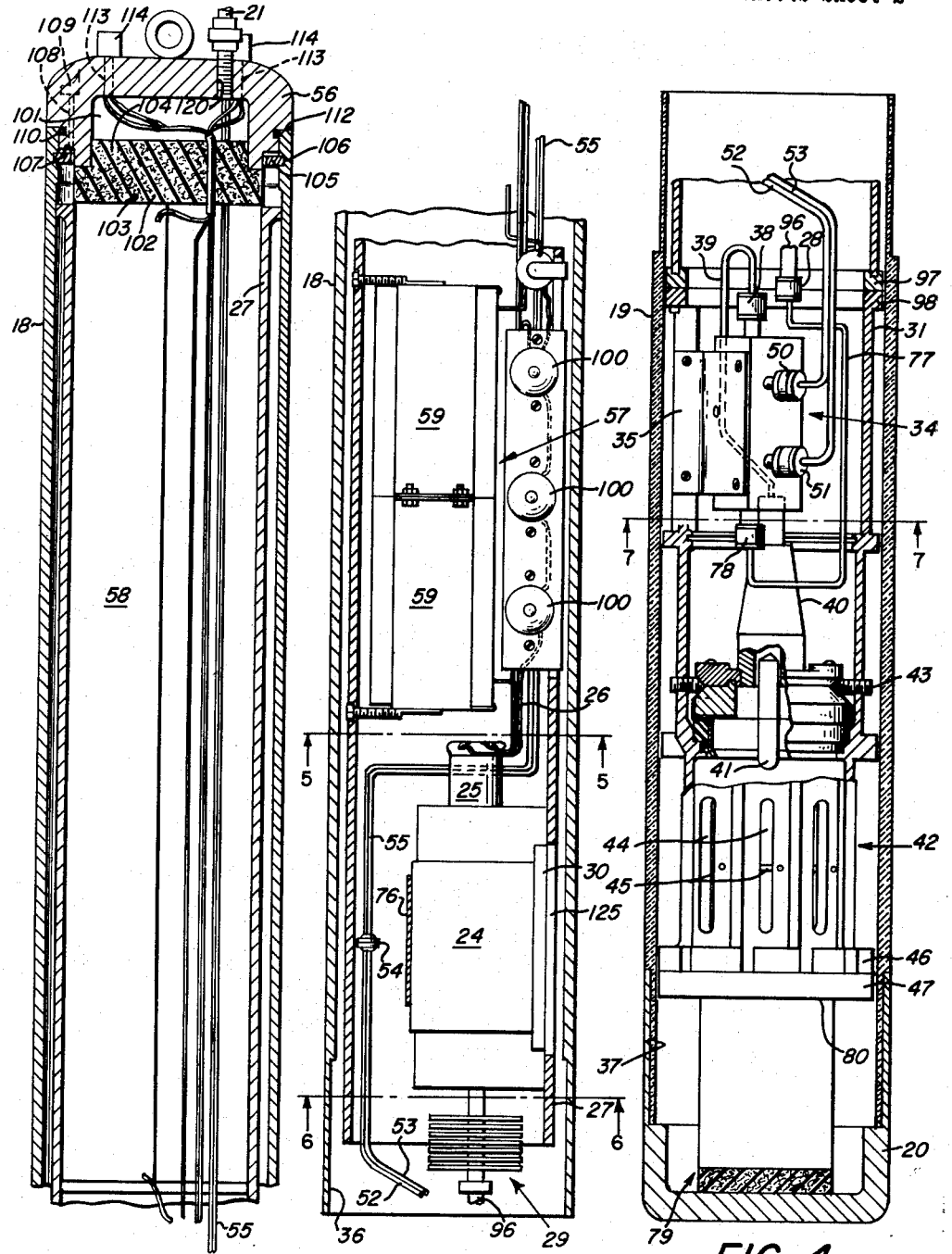
FIG. 2 shows a longitudinal sectional view of a first upper portion of the capsule of the invention shown in FIG. 1.
FIG. 3 shows a longitudinal sectional view of a second central portion of the capsule of the invention.
FIG. 4 shows a longitudinal sectional view of a third lower portion of the capsule of the invention shown in FIG. 1.
Figure 5:
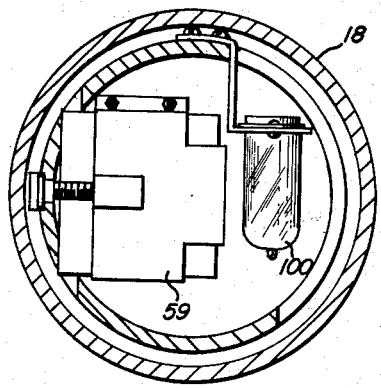
Figure 6:
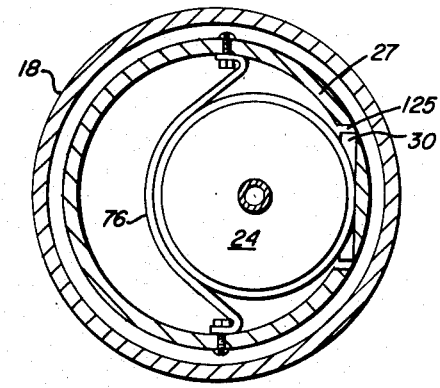
Figure 7:
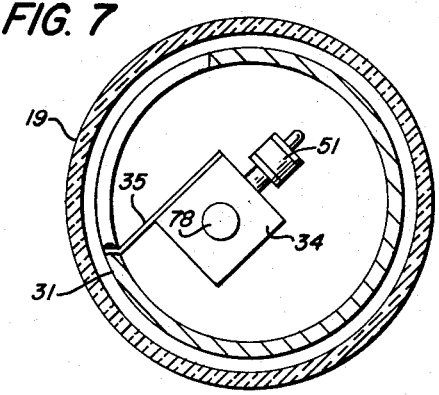

FIGS. 5, 6 and 7 show transverse sectional views taken at the regions designated 5—5, 6—6, and 7—7 along the capsule portions shown in FIGS. 3 and 4;

FIG. 8 shows a partially diagrammatic and partially schemmatic diagram of the voltage standing wave ratio indicator system of the invention; and FIG. 9 shows a partially diagrammatic and partially schemmatic diagram of the power supply utilized in the invention.

In FIG. 1 there is shown a well bore 10 of the conventional "open hole" type. A well bore casing 11 extends from the surface of the well to a point approximately above a petroleum bearing formation 12. As is conventional in such constuctions, the casing is enclosed by cement 13 in order to prevent the passage of water from formations above the petroleum or "pay zone" formation into the well bore.

Extending from well head 14, there is a flexible cable 15 at the end of which there is attached a capsule 16 which represents an external view of one particular embodiment of the invention. The capsule is capable of being moved in a vertical direction as shown by arrow 95 so that suitable measurements may be taken along the entire length of petroleum or "pay zone" formation 12. The capsule may be approximately five or six feet long in the particular embodiment described herein, while the pay zone formation may extend for distances up to several hundred feet. The capsule may be raised and lowered by suitable and conventional means (not shown) located at the well head.

The capsule is attached to cable 15 by means of an eyebolt 17 secured to cap 56 of the capsule, said eyebolt being held by a conventional safety hook 9 as shown.

The capsule has a first upper metallic section 18 which, in the specific embodiment shown, may be constructed of aluminum or other suitable material. A second central section 19 made of a material, such as fiberglass, which is substantially transparent to the transmission of microwave energy, and a third lower, or nose cone, section 20 made of a metal, such as aluminum, complete the capsule. Nose cone section 20 provides a protective covering for the bottom of the capsule and encloses means for cushioning the components enclosed within the capsule as described in more detail in later paragraphs. In FIG. 1 there is also shown a signal cable 21 which is bonded to flexible cable 15 at various points along its length. Signal cable 21 contains a pair of conductive wire leads and extends from the capsule to a voltage standing wave ratio indicator 23 which is located at the surface of the well. The two wire leads within cable 21 carry signals having values proportional to the incident and reflected signals present at the formation.

In FIGS. 2–7 the individual components contained in the capsule and their relative locations are more clearly shown. FIGS. 2 and 3 show sectional views of the interior of cap 56 and upper metallic section 18 of capsule 16. FIG. 4 shows a sectional view of a portion of the capsule that includes the central plastic section 19 and nose cone section 20.

As depicted in FIG. 3, a high frequency energy source 24 is mounted at the approximate center of capsule 16 and is shown in this specific embodiment as a traveling wave tube of the conventional backward wave oscillator type. The upper end of backward wave oscillator 24 has a plug 25 to which there is connected a D.-C. voltage cable 26 connected from D.-C. power supplies located in the upper section of the capsule, as explained in more detail in later paragraphs.

Backward wave oscillator 24 is of a substantially conventional type and its operation is well known to those in the art. One particular description of the construction and operation of such a device may be found in Patent No. 2,837,684, entitled "Traveling Wave Devices," issued to R. McC. Unger on June 3, 1958. In the specific embodiment shown herein the output signal from backward wave oscillator 24 is available at high-frequency connector 28, which is shown at the upper part of FIG. 4 attached to the coaxial output lead 96 from tube 24. A plurality of cooling fins 29 are located at the lower end of backward wave oscillator 24. As shown most clearly with reference to FIGS. 3 and 6, backward wave oscillator 24 is mounted on a plate 30 which is seated against a cut-away portion 125 of an inner aluminum cylindrical casting 27 inserted within capsule 16. Aluminum casting 27 extends from a point below cap 56 to a point below backward wave oscillator 24. At its lower point casting 27 is attached to a first flanged ring 97 which is secured to a second flanged ring 98 of a second inner aluminum casting 31 as shown in FIG. 4. Backward wave oscillator 24 is held in place by a metal strap 76 suitably attached to casting 27, as shown more clearly in the cross-sectional view of FIG. 6.

Power is supplied to backward wave oscillator 24 by a pair of battery packs 57 and 58, the outputs of which are connected to oscillator 24 by way of D.-C. voltage cable 26 and plug 25. Battery pack 57 provides a nominal 6.3 volt D.-C. output voltage for the backward wave oscillator filament heaters. The batteries in low voltage filament battery pack 57 may be of the nickel-cadmium type which in this instance, are shown as substantially rectangular, parallel connected cells 59. Battery pack 58 supplies the necessary high voltages required for D.-C. excitation of the anode and delay line elements of backward wave oscillator 24. High voltage battery 58 may be of the mercury type and is utilized in conjunction with high voltage regulator tubes 100 to provide the nominal 400 volt delay line voltage and 169 volt anode voltage. The details of the power supply circuits are shown and described later with reference to FIG. 9.

As shown in FIG. 4 the output signal from backward wave oscillator 24 is obtained from connector 28 and is transmitted by way of a coaxial cable 77 to a second high-frequency coaxial connector 78. Connector 78 provides a connection to a bi-directional coupler 34 which is supported by means of mounting plate 35 attached to cylindrical casting 31, as shown in FIGS. 4 and 7. Bi-directional coupler 34 is a conventional device utilized to monitor r-f incident and reflected power that is present on a coaxial transmission line. Its construction is well known to those skilled in the art and is described in more detail in an article entitled "A Wide-Band Directional Coupler," by H. C. Early, in the Proceedings of the Institute of Radio Engineering of November 1946.

Bi-directional coupler 34 is connected at its input end via connector 78, cable 77 and connector 28 to the high-frequency energy source, which in this particular embodiment of the invention is represented by backward wave oscillator 24. The output end of bi-directional coupler 34 is connected by way of high-frequency coaxial connector 38 and cable 39 to a tapered coaxial line 40 and, thence, to an antenna 41 which projects into a radiation cavity 42. Radiation cavity 42 is formed by the lower portion of cylindrical aluminum casting 31 and has a plurality of vertical slots 44 and suitable probes 45 located therein. The operation of radiation cavity 42, slots 44 and probes 45, so as to provide radiated microwave energy outwardly through slots 44 is substantially the same as that described with reference to the radiation cavity shown and discussed in my previously filed, above mentioned application. The tapered coaxial line and antenna are held in place at the center portion of aluminum casting 31 by means of mounting screws 43, as shown. In this particular application the size of antenna 41 is approximately the same as that associated with the radiating antennas of the magnetrons shown in my previously filed application and is matched to the size of output coaxial cable 39 from bi-directional coupler 34 by means of tapered coaxial line 40.

The lower portion of aluminum casting 31 is secured by mounting rings 46 and 47 to a fabricated rubber-based column suitably placed below the bottom surface 80 of mounting ring 47. Rubber-based column 79 extends along the length of and comes to rest at the bottom of nose cone section 20 to provide protection against shock and vibration for the internal components of capsule 16.

Bi-directional coupler 34 has a pair of monitoring connectors 50 and 51 to which are connected a pair of cables 52 and 53 which transmit signals proportional to the reflected and incident power, respectively, to a plug 54 shown in FIG. 3. Plug 54 provides a connection to a flexible two-wire cable 55 which extends through the open regions of the interior of capsule 16 and, thence, through cap 56 at the top of the capsule to the surface where it is connected to a voltage standing wave ratio (VSWR) indicator 23 as shown in FIG. 1. The electrical connections between bi-directional coupler 34 and VSWR indicator 23 are shown in more detail in FIG. 8.

Fiberglas section 19 of capsule 16 extends from a region that is approximately at the output end of the backward wave oscillator to the upper portion of metallic nose cone section 20. The fiberglas section of the capsule is bonded to aluminum castings 18 and 20 by suitable adhesive material at locations denoted by reference numerals 36 and 37 respectively.

At the top of capsule there is located a cap 56 for sealing in the components located within the capsule as shown in FIG. 2. Cap 56 has an inner cylindrical recess 101 into which there is fitted a portion of a cylindrical rubber block 102 whose bottom surface 103 rests against the upper surface of high voltage battery pack 58 and whose upper portion 104 is inserted into the recess as shown. A split metallic ring 105 is held within an indentation 106 at the inner surface of upper aluminum section 18 of capsule 16. Split ring 105 has a plurality of threaded holes 107 located therein into which are threaded a plurality of screws 108 (shown by dashed lines in FIG. 2) inserted through corresponding holes 109 located in cap 56. An O-ring 110 positioned within an indentation provided in cap 56 provides a suitable seal. Cap 56 has a shoulder 112 which rests against the upper surface of aluminum section 18 of the capsule so that when screws 108 are threaded into holes 107 the capsule is seated tightly against the upper portion 18 of capsule 16.

A pair of openings 113 are located in cap 56 for the insertion of a pair of plugs 114 having metallic ends. As shown with reference to FIG. 9, conductive wires 131 and 132 from one side of battery packs 57 and 58, respectively, are brought to the contacts of jacks 116 and 117, respectively (as shown more clearly in FIG. 9), so that when plugs 114 are inserted into openings 113, a connection is made to supply suitable D.-C. voltages to the backward wave oscillator.

Another opening 120 is provided in cap 56 so that signal cable 21 (which is the extension of cable 55 within the capsule) may be brought out from the capsule to the surface of the well bore.

A final opening (not shown) may be provided in cap 56 to provide for the insertion of a pipe connection to allow the capsule to be filled with air or other suitable gases during operation.

The excitation of backward wave oscillator 24 is shown more clearly in the power supply schematic diagram shown in FIG. 9. In that figure high voltage battery pack 58 has its positive terminal connected to ground and also to the anode 125 of backward wave oscillator 24. The negative terminal of battery 58 is connected to one side of contact jack 117, the other side of which is connected to one side of a variable resistor 126. The movable arm 127 of resistor 126 is connected to the negative terminal of low voltage battery supply 57 and, thence, to one side of heater 128 of backward wave oscillator 24. The positive terminal of low voltage battery 57 is connected to the other side of heater 128 through the contacts of jack 116 in a manner similar to that described with reference to the wire 132 from high voltage battery 58. Three conventional voltage regulator tubes 100 are connected in series from the negative terminal of battery supply 57 to the positive grounded terminal of battery supply 58. Thus, high-voltage D.-C. excitation voltages are supplied to anode 125 and the delay line of backward wave oscillator which for clarity is schematically represented in FIG. 9 by element 128. When switch plugs 114 are inserted into cap 56 the contacts of jacks 116 and 117 are closed and suitable high and low voltages are supplied to backward wave oscillator 24 as required.

When backward wave oscillator 24 is excited, it supplies a high-frequency output signal to bi-directional coupler 34. The incident energy which is so generated is transmitted through directional coupler 34 to antenna 41 from whence it is radiated to the subsurface formation by means of radiation cavity 42 through slots 44 as explained with reference to my previously mentioned application. A portion of the transmitted energy may be reflected from the well bore formation back to the capsule where it is received by antenna 41 and fed back to bi-directional coupler 34. A predetermined portion of the incident energy from backward wave oscillator 24 is provided at bi-directional coupler output connector 50 and a predetermined portion of the reflected energy is provided at bi-directional coupler output connector 51. The operation and interconnections of bi-directional coupler 34 in conjunction with VSWR indicator 23 is described in later paragraphs with reference to FIG. 8. Thus, signal voltages proportional to incident and reflected power is obtained at output connectors 50 and 51 and fed to the surface VSWR indicator by way of plug 54 and cable 55.

FIG. 8 shows the electrical connections of bi-directional coupler 34 and VSWR indicator 23. In that figure, bi-directional coupler 34 is shown diagrammatically as having output connectors 50 and 51. A pair of crystals 81 and 82 are shown in each signal line which feeds connectors 50 and 51. In a particular embodiment the crystals may be located within the bi-directional coupler housing. Cables 55 and 21 carry leads 83 and 84 to a voltage standing wave ratio indicator 23. VSWR indicator 23 includes a pair of filters 85 and 86, the inputs of which are connected to crystals 81 and 82 and the outputs of which are connected to contacts of dual switch 89. When the switch is in the upper position A, as shown in the drawing, the transmitted incident power that is being monitored at bi-directional coupler 34 is applied to microammeter 90 through fixed resistor 91 so that a direct measurement of the incident power is indicated. When the switch is in the second position B, the reflected power from output connector 51 is connected to microammeter 90 through resistor 91 so that a direct measurement of the reflected power is indicated.

When the switch is in the third, or calibrate, position C, the incident power is applied to microammeter 90 through variable resistor 92 and resistor 92 is adjusted to provide a maximum scale deflection on the meter. When the switch is placed in the lower position D a direct reading of the voltage standing wave ratio of reflected to incident power is, thus, obtained on an appropriate scale of the meter. From this measurement the ratio of reflected to incident ratio can be obtained from Equation 1 discussed previously.

Since the radiated incident and reflected energy is transmitted and received substantially omnidirectionally from the slots located about the periphery of the capsule, the reflected to incident energy measurement represents substantially the average reflection around the circumference of the well bore. By suitably recording the voltage standing wave ratio measurements as the capsule is moved vertically along the length of the "pay zone" formation, it is possible to obtain a continuous measurement of the reflection characteristics of the particular "pay zone" formation involved. A measurement of these reflection characteristics provides an indication of the capability of the formation to absorb microwave energy and allows the operator to make a determination as to which regions produce an excessive amount of reflected energy such as to cause damage to the magnetrons in the oil well microwave heating tool described in my previously filed, above mentioned application.

In one specific embodiment of the invention, backward wave oscillator 24 is of the O-type and emits approximately 800 milliwatts of energy at a norminal frequency value of 2450 megacycles. In a specific embodiment, the bi-directional coupler, which provides the intelligence signals proportional to the incident and reflected power levels, may be calibrated at the surface prior to insertion of the capsule into the well bore to produce from either probe a full scale reflection on the microammeter of the VSWR indicator circuit resistance of 4000±1% ohms when the R-F power in the appropriate direction in the transmission line is 0.3 watt. Operation of the logging capsule with the particular available battery packs can be sustained for approximately ten hours or more. The mercury cells may be of the discardable type, while the nickel-cadmium cells may be, in a specific embodiment, rechargeable for further use.

Although, in the application described above, the invention may be utilized in association with a microwave heating device, other uses of the invention with reference to its application as a general logging tool to supplement information obtained by other conventional logging tools of the neutron, sonic or caliper type, and the like, is possible. For example, a measurement of the dielectric constant of a core formation can be obtained as follows:

If the voltage standing wave ratio is measured by meter 90, the value of the ratio of reflected power to incident power is determined in accordance with Equation 1. From that determination a measure of the ratio of transmitted to incident power is obtained in accordance with the following equation:

$$\frac{P_T}{P_I} = 1 - \alpha \qquad (2)$$

where $\alpha$ has been defined previously with reference to Equation 1 and $P_T$ and $P_I$ are the transmitted and incident power, respectively. From the calculation of $P_T/P_I$ it is possible to determine the value of the reflection coefficient $r_0$ as follows:

$$\frac{P_T}{P_I} = (1 - r_0)^2 \qquad (3)$$

If the reflection coefficient $r_0$ is, thus, known, it is possible to calculate the dielectric constant by means of the following relationship:

$$r_0 = \frac{1 - \sqrt{K}}{1 + \sqrt{K}} \qquad (4)$$

where K is defined as the dielectric constant of the core material into which the energy is being radiated.

Knowledge of the dielectric constant provides knowledge of the general characteristics of the pay formation. For example, value of a K close to 60 or more, indicates a relatively high content of water, while a K in the neighborhood of 10 or less indicates a low water content.

Moreover, for in situ combustion techniques it may be desirable to cause ignition by utilizing microwave energy to generate sufficient heat to cause combustion to begin. Thus, it is desirable to determine at which region of the well bore the most efficient microwave ignition will take place. Generally this ignition region will occur in the region of the well bore having a high dielectric constant where the greatest amount of energy will be absorbed. The logging tool of the invention will, therefore allow such a determination to be made.

In the description of the invention discussed above, the backward wave oscillator was utilized as a constant frequency device, although it is clear that the frequency of the oscillator can be easily varied by providing a variation in the anode voltage. Thus, the characteristics of a core formation as a function of frequency can be readily determined.

Other variations in the structure and uses of the device described herein will occur to those skilled in the art within the intended scope of the invention. Thus, the invention is not to be construed as limited to the particular embodiment shown and discussed herein except as defined by the appended claims.

What is claimed is:
1. In combination, a capsule adapted to be positioned within a well bore; a backward wave oscillator mounted within said capsule for generating high frequency energy; means connected to said backward wave oscillator for supplying excitation voltages to said backward wave oscillator; means coupled to said backward wave oscillator for radiating said high frequency energy from said well bore into a sub-surface petroleum formation; a bidirectional coupler being mounted within said capsule and having a first terminal connected to said backward wave oscillator and a second terminal connected to said radiating means, said bidirectional coupler having first means for obtaining a first signal proportional to the high frequency energy incident on said sub-surface formation and second means for obtaining a second signal proportional to the high frequency energy reflected from said sub-surface formation; indicating means positioned at the surface of said well bore and responsive to said first and second signals for measuring the voltage standing wave ratio of said incident and reflected energy.

2. In combination, a capsule adapted to be positioned within a well bore; a backward wave oscillator mounted within said capsule for generating high frequency energy; a battery source mounted within said capsule and connected to said backward wave oscillator for supplying excitation voltages to said backward wave oscillators; means coupled to said backward wave oscillator for radiating said high frequency energy from said well bore into a sub-surface petroleum formation; a bidirectional coupler being mounted within said capsule and having a first terminal connected to said backward wave oscillator and a second terminal connected to said radiating means; said bidirectional coupler having first means for obtaining a first signal proportional to the high frequency energy incident on said sub-surface formation and second means for obtaining a second signal proportional to the high frequency energy reflected from said sub-surface formation; indicating means positioned at the surface of said well bore and responsive to said first and second signals for measuring the voltage standing wave ratio of said incident and reflected energy.

3. In combination, a capsule adapted to be positioned within a well bore, a portion of said capsule being constructed of a material substantially transparent to the transmission of high frequency energy; a backward wave oscillator mounted within said capsule for generating high frequency energy; a plurality of batteries mounted within said capsule and connected to said backward wave oscillator for supplying excitation voltages to said backward wave oscillator; antenna means mounted within said capsule; a bidirectional coupler mounted within said capsule and having a first terminal connected to said backward wave oscillator and a second terminal connected to said antenna means; cavity means coupled to said antenna means for radiating said high frequency energy from said well bore into a sub-surface formation; said bidirectional coupler having first means for obtaining a first signal proportional to the high frequency energy incident to said sub-surface formation and second means for obtaining a second signal proportional to the high frequency energy reflected from said sub-surface formation; indicating means positioned at the surface of said well bore and responsive to said first and second signals for measuring the voltage standing wave ratio of said incident and reflected energy.

References Cited in the file of this patent

UNITED STATES PATENTS

| | | |
|---|---|---|
| 2,455,941 | Muskat et al. | Dec. 14, 1948 |
| 2,455,942 | Coggeshall et al. | Dec. 14, 1948 |
| 2,766,422 | Carbonetto | Oct. 9, 1956 |
| 2,775,737 | Purcell | Dec. 25, 1956 |
| 2,843,733 | Harrison | July 15, 1958 |